United States Patent
El Khayat et al.

(10) Patent No.: US 9,591,002 B2
(45) Date of Patent: Mar. 7, 2017

(54) METHOD AND SYSTEM FOR PROVIDING TRUSTWORTHINESS OF COMMUNICATION

(75) Inventors: Ibtissam El Khayat, Glons (BE); Stephan Baucke, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 735 days.

(21) Appl. No.: 12/937,565

(22) PCT Filed: Apr. 15, 2008

(86) PCT No.: PCT/EP2008/002993
§ 371 (c)(1),
(2), (4) Date: Nov. 17, 2010

(87) PCT Pub. No.: WO2009/127225
PCT Pub. Date: Oct. 22, 2009

(65) Prior Publication Data
US 2011/0055549 A1    Mar. 3, 2011

(51) Int. Cl.
*H04L 29/06*    (2006.01)
*H04L 12/715*   (2013.01)
*H04W 40/32*    (2009.01)

(52) U.S. Cl.
CPC ............ *H04L 63/104* (2013.01); *H04L 45/04* (2013.01); *H04L 45/46* (2013.01); *H04W 40/32* (2013.01); *H04L 63/126* (2013.01)

(58) Field of Classification Search
CPC ..... G06F 21/44–21/445; G06F 21/60–21/606; G06F 21/64;

(Continued)

(56) References Cited

U.S. PATENT DOCUMENTS

2002/0184310 A1* 12/2002 Traversat et al. ............. 709/204
2003/0182171 A1*  9/2003 Vianello .......... G06Q 10/06311
                                                       705/7.14

(Continued)

OTHER PUBLICATIONS

Dimitriou, Tassos et al. "A Localized, Distributed Protocol for Secure Information Exchange in Sensor Networks". Parallel and Distributed Processing Symposium, 2005. Proceedings, 19th IEEE International. 1530-2075/05.*

(Continued)

*Primary Examiner* — Alexander Lagor
*Assistant Examiner* — Kevin Bechtel
(74) *Attorney, Agent, or Firm* — Coats & Bennett, PLLC

(57) ABSTRACT

A method and system of providing trustworthiness of communication among a plurality of communication nodes is described. This comprises arranging each of said communication nodes to perform a trustworthiness judging operation on received data elements for judging a received packet to be trustworthy or not, grouping said plurality of communication nodes into a plurality of distinguishable clusters, each cluster comprising at least two of said communication nodes, implementing in each respective cluster an intro-cluster trust mechanism such that trustworthiness of data elements sent by any member node of said respective cluster is judgable within said respective cluster, arranging said clusters such that each of said clusters comprises one or more multi-cluster-member nodes that belong to at least two different of said clusters, and muting inter-cluster traffic through said multi-cluster-member nodes.

16 Claims, 5 Drawing Sheets

(58) Field of Classification Search
CPC ............... G06F 15/17306–15/17331; G06F 15/17356–15/17393; H04L 9/3247–9/3257; H04L 63/08; H04L 63/0823; H04L 63/0876; H04L 63/104; H04L 63/126; H04L 67/10–67/1097; H04W 12/06; H04W 40/32
USPC ..... 713/150, 168, 176–179; 726/4–6, 11–15, 726/29–30
See application file for complete search history.

(56) References Cited

U.S. PATENT DOCUMENTS

2006/0090074 A1* 4/2006 Matoba .................. 713/171
2008/0060055 A1* 3/2008 Lau .................. H04L 63/0823
726/3

OTHER PUBLICATIONS

Partial Script Transcription of: Office Space. Dir. Mike Judge. By Mike Judge. Perf. Ron Livingston, Jennifer Aniston, David Herman. Twentieth Century Fox Film Corporation, 1999. Film.*

Bechler, M. et al. "A Cluster-Based Security Architecture for Ad Hoc Networks." 23rd Annual Joint Conference of the IEEE Computer and Communications Societies (INFOCOM 2004), vol. 4, Piscataway, NJ, USA, Mar. 7, 2004, pp. 2393-2403.

Chen, S. et al. "Secure Anonymous Routing in Trust and Clustered Wireless Ad Hoc Networks." 2nd International Conference on Communications and Networking in China (CHINACOM '07), Piscataway, NJ, USA, Aug. 22, 2007, pp. 994-998.

Dimitriou, T. et al. "A Localized, Distributed Protocol for Secure Information Exchange in Sensor Networks." 19th IEEE International Parallel and Distributed Processing Symposium, Denver, CO, USA, Apr. 4-8, 2005.

Slijepcevic, S. et al. "On Communication Security in Wireless Ad-Hoc Sensor Networks." 11th IEEE International Workshops on Enabling Technologies: Infrastructure for Collaborative Enterprises (WET ICE 2002), Piscataway, NJ, USA, Jun. 10-12, 2002, pp. 139-144.

Iwata, A. et al., "Scalable Routing Strategies for Ad Hoc Wireless Networks", IEEE Journal on Selected Areas in Communications, Aug. 1999, pp. 1369-1379, vol. 17, No. 8.

Ericsson, "4WARD—Architecture and Design for the Future Internet", Large-scale integrating project (IP) proposal, ICT Call 1, FP7-ICT-2007-1; May 8, 2007, pp. 1-171.

* cited by examiner

METHOD AND SYSTEM FOR PROVIDING TRUSTWORTHINESS OF COMMUNICATION

TECHNICAL FIELD

The present application relates to a method and system for providing trustworthiness of communication between a plurality of packet communication nodes.

BACKGROUND

In packet communication an amount of data is divided into parts and these parts are placed into packets for communication from a source to a destination via a system of packet communication nodes. Such systems of nodes can be provided in many different ways, e.g. by interconnection of several different networks that thereby form an internet or interconnected network.

One recurring problem in systems of packet communication networks is that of communication trustworthiness. Namely, due to the nature of packet oriented communication, where packets are sent from one node to the next and possibly pass a large number of nodes on their journey from source to destination, without fixed paths for communications between specific terminal nodes, there is in principle the danger that packets are introduced into the system with malicious intent. For this reason it is known to add mechanisms for policing and filtering packets, e.g. by adding security features (such as digital signatures or more generally security tags) to packets sent or forwarded by legitimate nodes and verifying these features at specific network points. If the presence of the required security feature is verified, the packet is considered trustworthy and processed regularly, e.g. forwarded towards the destination indicated in the packet, and if the security feature is not verified, the packet is treated as not coming from a legitimate source and processed accordingly, e.g. dropped or quarantined.

System points for performing such tests for trustworthiness can be gateways between individual administrative domains, such as different autonomous systems (AS). The nodes of each administrative domain are under the physical control of one entity, e.g. an Internet Service Provider (ISP), and illegitimate packets can therefore only come from the outside. Consequently, policing and filtering functions, such as provided by a fire-wall function, are implemented in gateway nodes that connect the given domain with other domains.

Such a concept works well under the described circumstances, i.e. when separate administrative domains are present. However, the concept is not applicable in all cases, e.g. if physical control of nodes and gateways can not be guaranteed. This may for example be the case in some virtual networks or ad-hoc networks. Virtual networks are formed by virtual nodes, i.e. each virtual node is an instance on a physical node than can host several virtual nodes, such that one physical infrastructure comprising physical nodes and physical links can host a plurality of virtual networks, each having its own virtual nodes and virtual links between virtual nodes. The physical infrastructure is therefore shared by a plurality of virtual network operators (VNO), none of which has control over the physical nodes, such that e.g. packets from one virtual network can leak into another virtual network due to mis-configuration at a physical node that hosts virtual nodes of the two virtual networks in question.

SUMMARY

The object of the invention is to provide a new concept for providing trustworthiness of communication between a plurality of communication nodes, especially one that is generally applicable and preferably also scalable for node systems of different sizes and which is flexibly implementable.

Accordingly, the present application proposes a method of providing trustworthiness of communication among a plurality of communication nodes, said method comprising: arranging (S21) each of said communication nodes to perform a trustworthiness judging operation on received data elements for judging a received data element to be trustworthy or not, grouping (S22) said plurality of communication nodes into a plurality of distinguishable clusters, each cluster comprising at least two of said communication nodes, implementing (S23) in each respective cluster an intra-cluster trust mechanism such that trustworthiness of data elements sent by any member node of said respective cluster is judgable within said respective cluster, arranging said clusters such that each of said clusters comprises one or more multi-cluster-member nodes that belong to at least two different of said clusters, and routing (S24) inter-cluster traffic through said multi-cluster-member nodes.

Equally, a system is proposed that comprises a plurality of communication nodes, each arranged to perform a trustworthiness judging operation on received data elements for judging a received data element to be trustworthy or not, said plurality of communication nodes being grouped into a plurality of distinguishable clusters, each cluster comprising at least two of said communication nodes, such that each respective cluster implements an intra-cluster trust mechanism such that trustworthiness of data elements sent by any member node of said respective cluster is judgable within said respective cluster, said clusters being arranged such that each of said clusters comprises one or more multi-cluster-member nodes that belong to at least two different of said clusters, and said plurality of communication nodes being arranged to perform routing of inter-cluster traffic through said multi-cluster-member nodes.

In accordance with the proposed concept a system of communication nodes is arranged such that each node performs a trustworthiness judging operation on received data elements. A data element is any identifiable and distinguishable arrangement of data that can be communicated, such as a packet (which may have different names in different contexts, such as protocol data unit, service data unit, frame, etc.) or a data stream (such as a bit or byte stream). It is therefore noted that the present invention is not limited to packet communication systems.

The trustworthiness judging operation can be implemented in any suitable or desirable way, for example a security tag, such as a digital signature can be verified. In other words, each node performs a desired form of packet policing, thereby enabling trustworthy communication regardless of the underlying network circumstances. It is not necessary to have certain nodes under common physical control, like in an administrative domain, and there are no principal limitations. Thereby, the present concept is generally applicable.

Furthermore, the nodes are grouped into a plurality of clusters, each cluster having at least two nodes. An intra-cluster trust mechanism is implemented in each cluster such that trustworthiness of data elements sent by any member node of a respective cluster is judgable within that respective cluster. In other words, trustworthiness is established on a per-cluster basis. This can be done in any suitable or desirable way, e.g. by using a common key (for symmetric encryption) or common key pair (for asymmetric encryption or signing) for all nodes of a given cluster.

Each cluster comprises at least one multi-cluster-member node, i.e. a node that simultaneously belongs to two or more clusters. Furthermore, the nodes of the system are controlled such that inter-cluster traffic is routed through the multi-cluster-member nodes, e.g. by appropriately arranging routing tables in the nodes. By virtue of the intra-cluster trust mechanism implemented in each cluster, a multi-cluster-member node can forward a data element received from one cluster into another cluster to which the multi-cluster-member node belongs, and the recipient cluster will be able to judge the packet to be trustworthy. In this way trustworthy communication can be established over the entire system of communication nodes, from one cluster to the next, without having to implement a common mechanism for all nodes. In other words, it can be avoided to e.g. use a single key set for all nodes of the system, which is not desirable in terms of security, and it can equally be avoided to have to share keys of every node with every other node, which is obviously not scalable and very difficult to manage. In contrast, the presently proposed concept establishes trust relationships on a per-cluster basis, which in effect means that the management of trust relationships is decoupled between different clusters and thereby both scalable over a system of nodes and greatly simplified in comparison to management in the overall system of all nodes.

It is pointed out that the grouping into clusters can be done in any suitable or desirable way for a given system of nodes, as long as the condition is met that each cluster has at least one multi-cluster-member node. The definition should be such that each node belongs to at least one cluster and that all clusters are connected, in order to be able to transmit packets from any one node to any other node. Accordingly, in large systems there exist a great number of possibilities for choosing the number of clusters and which nodes to associate with which cluster. This underscores the significant flexibility and general applicability of the proposed concept, as this concept can thereby be applied to almost any imaginable topology of nodes and independently of specific network technologies. It can also be applied to arbitrary kinds of data being communicated, i.e. voice communications, signaling communications, file exchange, etc.

BRIEF DESCRIPTION OF THE DRAWINGS

The following detailed description will make reference to examples shown in the accompanying Figures, in which:

FIG. 1b shows a first example of a plurality of clusters defined with respect to the system of nodes shown in FIG. 1a;

FIG. 1c shows a second example of a plurality of clusters defined with respect to the system of nodes shown in FIG. 1a;

DETAILED DESCRIPTION

Examples of the general concept of the invention explained above will now be discussed with reference to the Figures. It is noted that the description of examples is not meant to be limiting to the invention defined by the appended claims, as the examples only serve to gain a better understanding. For example, the following description will often refer to a system of packet communication nodes to which the concept of the invention can be applied, but this is only an example, as this concept can generally be applied to the communication of arbitrary data elements, e.g. also to data streams.

Figure 1A:
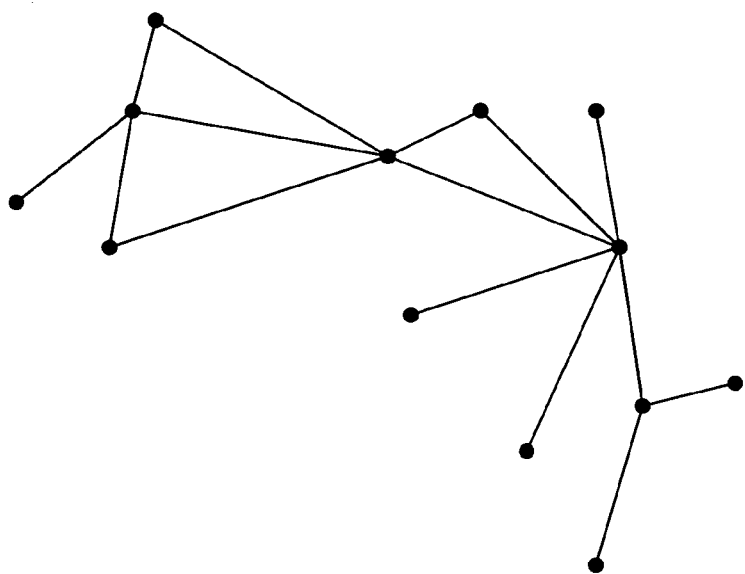
FIG. 1a shows a schematic representation of an example of a system of communication nodes connected by associated links.

FIG. 1a shows a simple example of a system of packet communication nodes, i.e. nodes arranged for transmitting, receiving and processing data packets that conform to a given protocol, such as for example nodes arranged to handle Internet Protocol (IP) packets. These nodes are represented as dots in the figure. They are connected by links, which are represented as lines in the figure.

Figure 1B:
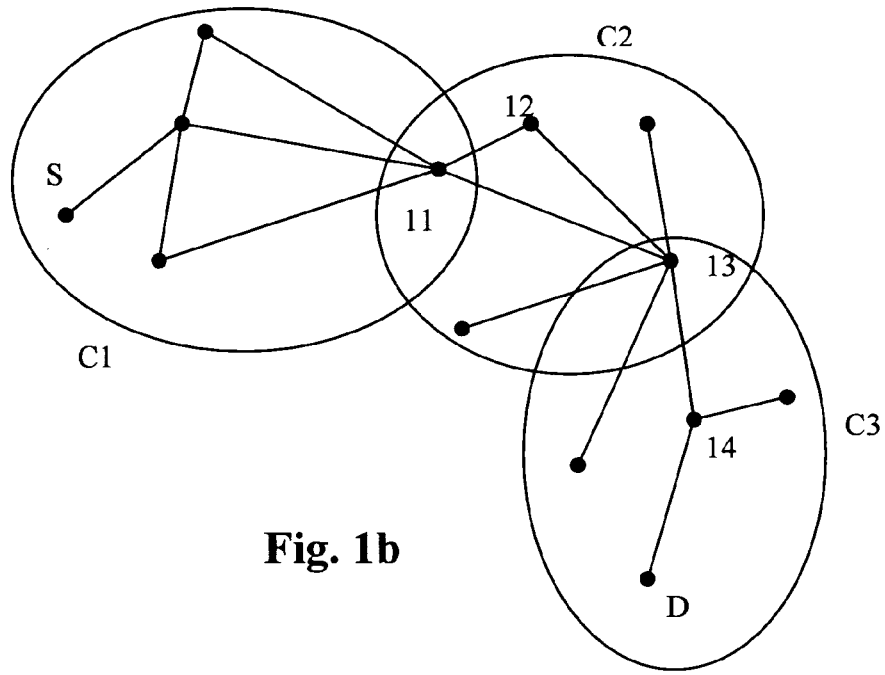

FIG. 1b shows the result of applying the concept of the invention to the system of FIG. 1a according to a first example. The nodes have been grouped into three clusters C1, C2 and C3, and two multi-cluster-member nodes 11 and 13 are shown, where node 11 is a member of clusters C1 and C2, and node 13 is a member of clusters C2 and C3. Each of the three clusters implements an intra-cluster trust mechanism. Furthermore, each of the nodes of the shown system performs a trustworthiness judging operation on received packets. For example, the intra-cluster trust mechanism may be implemented by a certification mechanism arranged such that data elements sent by any member node of the respective cluster are judged as trustworthy within that respective cluster. Such a certification mechanism can e.g. comprise that each node of a given cluster Ci ($i=1, 2, 3$) performs a certification operation on any packet being forwarded to another packet communication node belonging to the same cluster, e.g. encrypting the packets with a key Ki associated with the cluster Ci, i.e. used by all member nodes of cluster Ci. The trustworthiness judging operation performed in the nodes of cluster Ci can then consist in examining whether a received packet has been encrypted with key Ki. If it has, then the packet is trusted, otherwise it is considered untrustworthy and processed correspondingly, e.g. dropped.

Naturally, this is only an example. The trustworthiness judging operation performed by a node can comprise that the node in question itself examines the trustworthiness, and/or it may comprise requesting that this examination of trustworthiness be done by another node of the same cluster, e.g. a node designated for this task. If examination is requested from another node, this can e.g. be done by forwarding the data element to that other node and letting the other node complete the procedure of actually deciding whether the node is trustworthy or not and then performing the further processing (forward and forget). Alternatively or additionally, requesting examination from another node can also comprise that the requesting node waits for an answer from the examining node, in order to itself perform the further processing that depends on the outcome of the examination. In the latter case, it is possible that the requesting node only forwards a part of the data element, e.g. a security tag that can be examined independently of the rest of the data element.

The examining performed by a node may comprise one or more of examining a security tag (such as a digital signature), a decryption result and examining a path of arrival.

Above, a key was used as a means for certifying a packet. As an alternative or complement to using one key for certification (encrypting) and judging trustworthiness (decrypting) in symmetric encryption, it is also possible to use a key pair comprising a public key and a private key in asymmetric encryption/signing for certification (encrypting or signing) and judging trustworthiness (decrypting or analyzing a signature). When using key based procedures such as encryption or signing for the certification and trustworthiness judging procedures, it is possible to associate one, several or all of the clusters Ci with a corresponding respective key set KSi, each key set KSi comprising one or more keys to be used within associated cluster Ci for certification and judging trustworthiness.

As mentioned, the judging of trustworthiness may generally also comprise the examining of a security tag accompanying the data element. An example of a security tag is a digital signature, i.e. a piece of data generated from at least a part of the data element (e.g. from the content of one or more fields of a packet), a key and an algorithm. However, such a security tag can also be generated independently of the content of the data element, e.g. on the basis of a random number, a key and an algorithm. The nodes able to verify the security tag must then be in possession of the required components.

As further alternative or complement to the above described examples for an intra-cluster trust mechanism and for trustworthiness judging, it is possible to examine a path of arrival for trustworthiness, and to select a trustworthy path as a means of certification. Namely, if a packet is sent over a secure path, e.g. an encrypted tunnel, then this can also be taken to ensure trustworthiness of communication.

The shown three clusters are naturally also only an example, and the number of clusters can generally be any integer n greater than 1. At least a one of said n clusters can then be associated with a corresponding key set used for both the trustworthiness judging operations and said intra-cluster certification mechanism of that cluster, or preferably each i-th cluster Ci is associated with a corresponding i-th key set KSi used for both the trustworthiness judging operations and the intra-cluster certification mechanism of the i-th cluster Ci, where i=2, . . . , n. As already mentioned previously, a general advantage of the inventive concept lies in the decoupling of trust relationships between different clusters. In the context of the just described example of cluster Ci with associated key sets KSi, this means that if a key set of a given cluster has become compromised, this only has effect for the affected cluster and the remaining nodes of the system are unaffected. In other words, it would only be necessary to change the key set of the affected cluster, but not change keys or key sets for all nodes of the entire system. This greatly simplifies management of the trust relationships and thereby security in the system.

Above, an example was given of an intra-cluster certification mechanism that can comprise that each node of a given cluster performs a certification operation on any packet being forwarded to another packet communication node belonging to the same cluster. However, the providing of an intra-cluster certification mechanism in a cluster does not necessarily require a certification operation by each node of a cluster. If e.g. digital signatures with a cluster-wide key are used, then passing the trustworthiness judging operation can be a sufficient condition for allowing the packet to be forwarded with the same signature (assuming that the signature is calculated on the basis of a part of the packet that is not changed while forwarding), i.e. no further certification operation is necessary. In other words, only the initial node (e.g. a source node in the cluster, or the multi-cluster-member node that passes the packet from the outside into the cluster) of the cluster would actually perform a signing or more generally a tagging operation.

Equally, it is noted that the generalized trust mechanism implemented in a cluster does not require that each node has a trust relationship with each other node. According to the concept of the invention, it is only required that a judgability exist on the level of the cluster, i.e. that there be at least one node that can actually establish whether a data element is trustworthy or not. This can e.g. be done by letting nodes not capable of this decision forward a data element to a capable node, preferably to a multi-cluster-member node, which then makes the decision and thereby decides on the further fate of the data element.

Returning to the example of FIG. 1b, it is now assumed that a packet is to be sent from a source S to a destination D. Source S is in cluster C1, such that the sent packet conforms to the intra-cluster trust mechanism of C1, e.g. a certification mechanism where the packet is encrypted with a corresponding key K1. As can be seen, node 11 is the multi-cluster-member node that belongs to clusters C1 and C2. In accordance with the concept of the invention, traffic from C1 to C2 is therefore routed through node 11. This can e.g. be done by appropriately setting the routing tables used by the nodes of the system, or by any other suitable means for controlling the routing of packets among the nodes of the system. In the example, node 11 judges the received packet as trustworthy, on account of the fact that the packet conforms to the intra-cluster certification mechanism of C1 and node 11 belongs to C1. As it also belongs to C2, it will bring the packet into conformity with the intra-cluster certification mechanism of C2, e.g. encrypt it with the corresponding key K2 before forwarding the packet to another member of C2, e.g. directly to node 13. Routing could also be arranged such that the packet is routed via node 12 to node 13. In the example, node 13 is the multi-cluster-member node between clusters C2 and C3, for forwarding the packet to cluster C3, in which destination D lies. Similar to the action of node 11, node 13 will judge the packet to be trustworthy on account of the intra-cluster certification mechanism of C2 and bring the packet into conformity with the intra-cluster certification mechanism of C3, e.g. encrypt it with the corresponding key K3 before forwarding the packet to another member of C3, e.g. node 14. Node 14 then trusts the packet and forwards it to destination node D, which again can trust the packet, as it comes from another member of the same cluster C3 using the same intra-cluster certification mechanism.

Figure 1C:
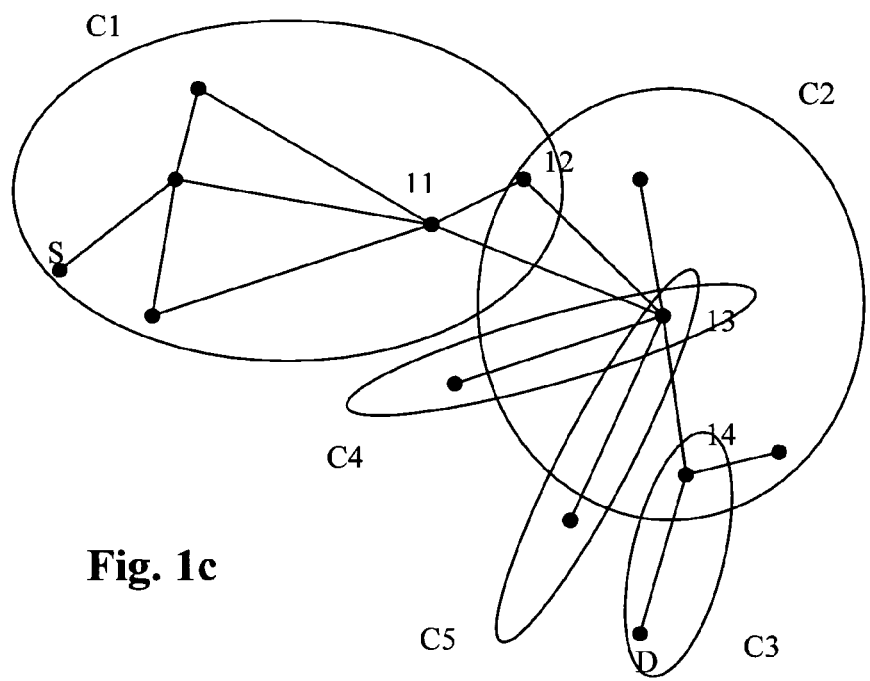

FIG. 1c shows an example where clustering is done differently for the system of nodes shown in FIG. 1a. In FIG. 1c five clusters C1 to C5 are defined, and node 12 is the multi-cluster-member node between clusters C1 and C2, while node 14 is the multi-cluster-member node between clusters C2 and C3. Accordingly, routing control is done differently in the example of FIG. 1c than in FIG. 1b, because routing of a packet from source node S to destination node D is done via node 12 for the transition from C1 to C2, and via node 14 for the transition between C2 and C3. In the shown example there is a link between node 11 and node 13, but in the shown configuration no traffic is routed via this link, as there is no intra-cluster trust relationship between nodes 11 and 13. Namely, they conform to different intra-cluster trust mechanisms and traffic must therefore pass through node 12 in this example.

In the shown examples of clustering, only one multi-cluster-member node was shown between two clusters. This is only an example to simplify explanation, and in general two clusters can share a larger number of multi-cluster-member nodes. For example, cluster C1 and C2 could also be defined in such a way that both nodes 11 and 12 are multi-cluster-member nodes to C1 and C2, thereby providing more flexibility in routing.

As can be seen from FIG. 1c, a node may be a multi-cluster-member node for more than two clusters, as node 13 acts as multi-cluster-member node for clusters C2, C4 and C5. Furthermore, it can be seen that the operation a node performs with respect to a packet being transmitted may depend on the routing to be applied to that packet. Namely, if a packet is to be sent from node 13 to node 14, then node 13 acts as an internal node of cluster C2, whereas if it sends a packet to a node in cluster C5, it acts for making a transition between two clusters, e.g. from C2 to C5 or from C4 to C5.

It can be said that a multi-cluster-member node acts as a representative of a cluster if it allows a packet to make a transition from one cluster to another. This role can be shared among several nodes, such that the several nodes effectively become multi-cluster-member nodes. For example, in the configuration shown in FIG. 1c it is possible that node 12 recognizes a special secure relationship with node 11, e.g. by being connected over a secure link, and shares the information necessary for implementing the intra-cluster certification mechanism of cluster C2, thereby making node 11 a multi-cluster-member node that can act as a type of "deputy" on behalf of node 12 for performing the trustworthy transition from cluster C1 to cluster C2.

The system shown in FIGS. 1a to 1c is a simple example that serves to explain basic aspects of the concept proposed in the present application. The inventive concept can well be applied to larger systems of nodes, for example systems having more than 20 nodes, or more than 50 nodes, or more than 100 nodes, or more than 1000 nodes. Equally, the number of clusters can be larger, for example more than 10 clusters, more than 50 clusters or more than 100 clusters.

Furthermore, although it is basically sufficient that a cluster comprises at least two nodes, it is also possible to apply the concept of the invention in such way that the rule for defining a cluster is that at least three nodes must be present in a cluster, or generally at least an integer number k>1, where k can e.g. be 3, 4, 5, 10, 15, 25.

Figure 2:
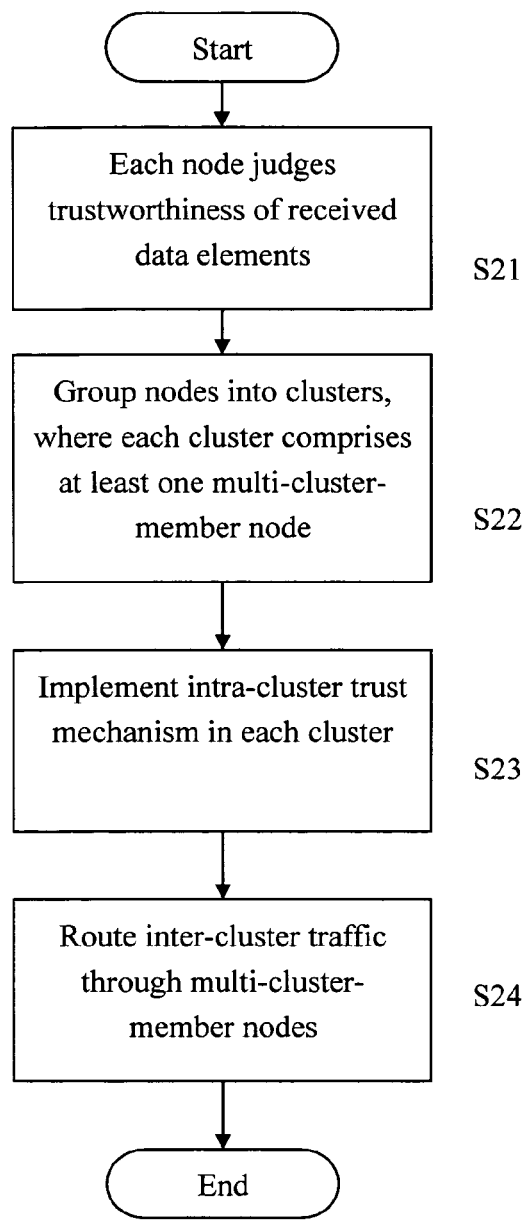
FIG. 2 shows a flow chart of a method embodiment of the invention.

FIG. 2 shows a flow chart of a method embodiment of the present invention, for providing trustworthiness of communication among a plurality of (e.g. packet) communication nodes. In step S21 each of the communication nodes is controlled to perform a trustworthiness judging operation on received data elements for judging a received data element to be trustworthy or not. In step S22 the plurality of communication nodes is grouped into a plurality of distinguishable clusters, each cluster comprising at least two of said communication nodes and one or more multi-cluster-member nodes that belong to at least two different clusters. In step S23 an intra-cluster trust mechanism is implemented in each respective cluster trustworthiness of data elements sent by any member node of the respective cluster is judgable within the respective cluster. Finally, according to step S24 routing control in the system is provided in such a way that inter-cluster traffic (i.e. traffic destined from one cluster to another cluster) is routed through said multi-cluster-member nodes. This can e.g. be done by appropriately setting the routing tables of the system nodes.

Figure 3:
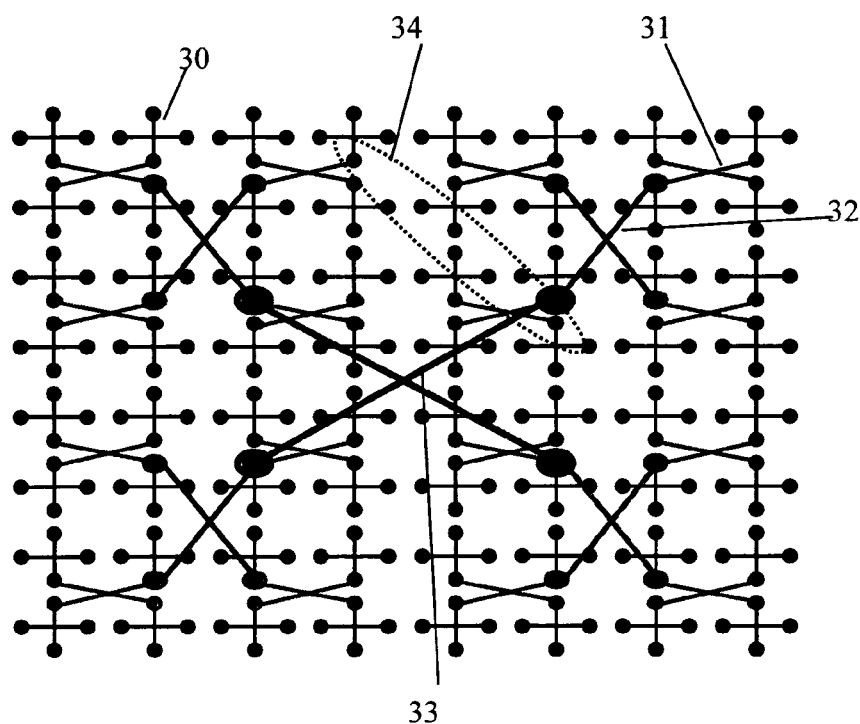
FIG. 3 shows a schematic representation of an example of clustering in a system of communication nodes.

As already explained previously, the concept of the present invention provides great flexibility, as there is considerable freedom in choosing clusters and assigning nodes to them. For example, individual multi-cluster-member nodes can belong to more than two clusters, which can be arranged to a form ranked hierarchy by again grouping several multi-cluster-member nodes into clusters, an example of which is shown in the schematic system representation of FIG. 3. Each bullet represents a node and each cross represents a cluster 30 (with 4 nodes). The example, with the exception of the cluster 34 indicated by the dashed ellipse, shows a hierarchy of clusters. A node belonging to one cluster only has rank 0. Cluster 31 groups nodes together that belong to two clusters and may be said to have rank 1. Cluster 32 groups nodes together that belong to three clusters and may be said to have rank 2. Cluster 33 groups nodes together that belong to four clusters and may be said to have rank 3. Further hierarchical levels could be introduced. Naturally, this is only one possibility of grouping nodes into clusters and in no way a requirement. A cluster as indicated by the dashed ellipse 34 can also be defined, and any of this cluster's nodes can potentially be a multi-cluster-member node.

Furthermore, due to the decoupling of trust relationships from cluster to cluster, the concept of the invention provides inherent scalability. Namely, the intra-cluster trust mechanism in any one cluster can be chosen and managed independent of the intra-cluster trust mechanism in other clusters. The concept of clustering for providing trustworthy communication as proposed in the present application can be applied simultaneously on different levels of scale. In other words, an intra-cluster trust mechanism in at least one of the clusters can comprise dividing that cluster into a plurality of sub-clusters, each sub-cluster in turn implementing an associated intra-sub-cluster trust mechanism and having at least one multi-sub-cluster-member node belonging to at least two different of said sub-clusters for routing inter-sub-cluster traffic. Naturally the sub-clusters can themselves be divided into sub-sub-clusters for applying the same principle again.

Figure 4:
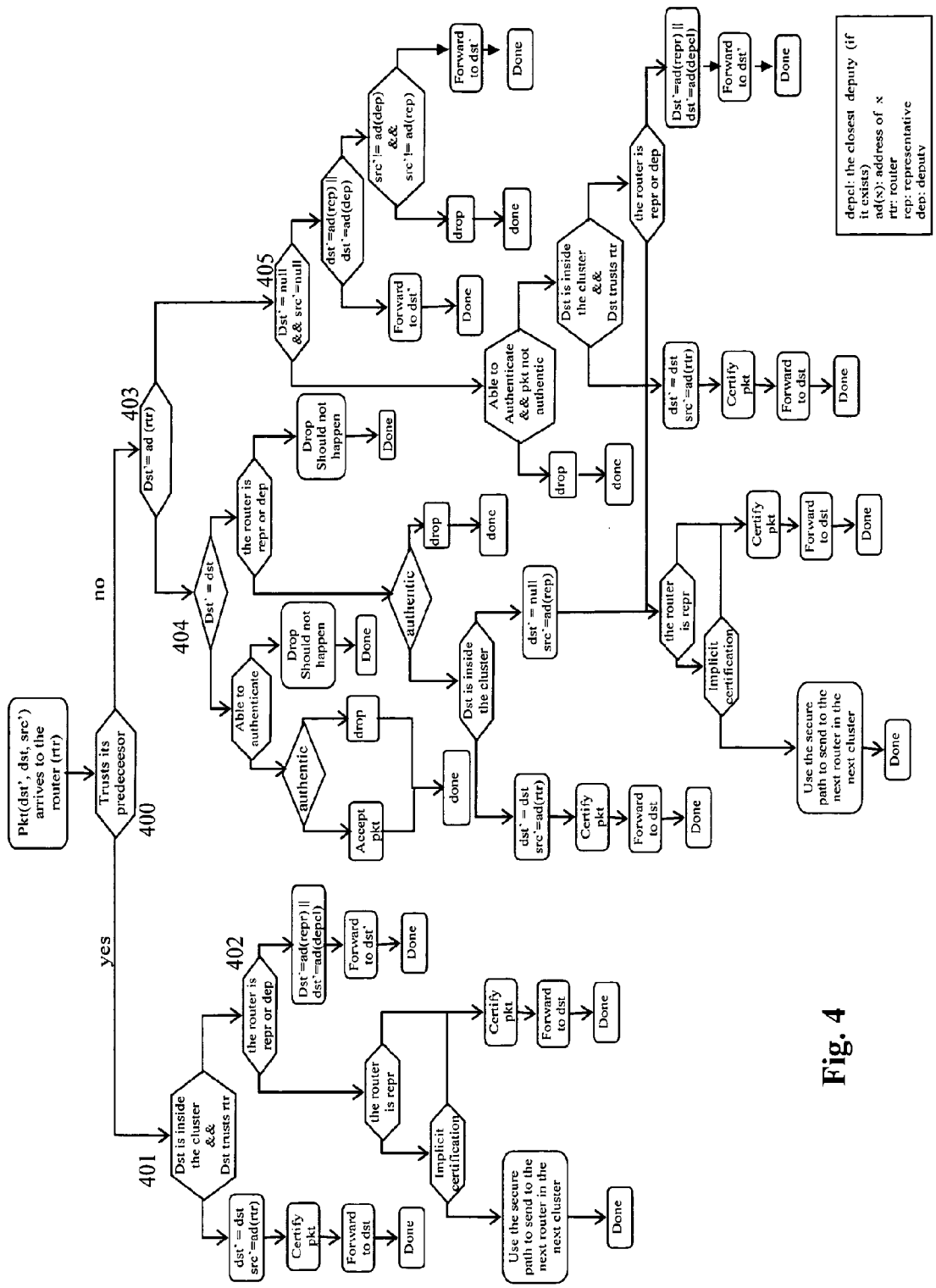
FIG. 4 shows a decision diagram for the processing of a packet in a packet communication router in accordance with an embodiment of the invention.

FIG. 4 shows a flow chart representing an example of decision procedure that could be performed by a router node in a system of packet communication nodes. In this example, it is assumed that the router node is a multi-cluster-member node, such that depending on the routing to be performed (e.g. on the packet's destination and the routing tables), it has to be decided whether the router acts as a cluster-internal node or a representative of the cluster for passing a received packet on to another cluster. It is furthermore assumed that the intra-cluster certification mechanism comprises using encryption, security tags (e.g. cryptographic signatures) and secure paths, such that appropriate decisions have to be made depending on the routing to be performed. The diagram is to be understood in such a way that each branching point is a decision step with a yes or no outcome, where branching to the right signifies a no outcome and branching to the left a yes outcome. Rectangular boxes signify processing steps. The term dst' signifies the immediate destination indicated in the received packet (Pkt), dst signifies the final destination indicated in the received packet, and src' signifies the immediate source indicated in the received packet. The term adr(x) stands for address of entity x, rtr for router, rep for representative, i.e. indicates a node acting as representative of the cluster, dep stands for deputy, i.e. a node acting as a deputy to the representative, and depcl indicates the closest deputy, if any deputies exist.

In a first decision 400, it is decided whether the router trusts the preceding node from which the packet has been received. If the packet arrives over a trusted path (e.g. an encrypted tunnel), then the packet is trusted, i.e. the trustworthiness judging operation judges the packet to be trustworthy. The procedure then branches to the next part of the operation, which is to decide on the forwarding/routing. Decision 401 determines whether the final destination dst is within the same cluster, in which case the immediate source address src' and immediate destination address dst' are reset and the packet is certified according to an intra-cluster certification mechanism and forwarded to the destination (see left-hand outcome of step 401). If the outcome of step 401 is no, then the packet must be forwarded to a different cluster, such that step 402 decides whether the router in question is a multi-cluster-member node for the present cluster and the cluster into which the packet is to be sent, i.e. whether the router acts as representative or deputy. If this is not the case, then the packet is addressed and sent to a node acting as representative or router (right-hand outcome of 402). If it is the case, then the packet is appropriately handled in accordance with an intra-cluster trust mechanism of the new cluster, which can involve a decision depending on the routing path whether to use a secure path or perform certification in the form of encryption or cryptographic signing (left-hand outcome of 402).

If the outcome of decision 400 is no, then the trustworthiness judging operation is continued. In decision 403 it is decided whether the address of the router is the immediate destination dst' indicated in the packet. If yes, step 404 determined whether the router is the final destination dst of the packet. If yes, then the packet is accepted if it is authentic and otherwise dropped, see left-hand branch of decision 404. If the outcome of step 404 is no, then the packet is appropriately forwarded, either to a node within the cluster or to a different cluster, or dropped if it is determined to not be authentic, see right-hand outcome of step 404.

The branch indicating a negative outcome of step 403 relates to a situation where there is no trust relationship between every member of the cluster. In other words, there can be packets that on which at least some cluster members can not themselves make a decision, and these are forwarded towards a representative that can make the decision. Therefore, packets can exist who's dst' is not the receiving router's address. The steps following decision 405 then ensure that the packet is appropriately processed, i.e. either forwarded or dropped.

As already pointed out above, the general concept of the present invention can achieve many advantages. The invention can e.g. be used to restrict access to a network in a scalable way, even if physical access to the network at untrusted locations cannot be prevented. In the context of network virtualization, it can be used to enforce the separation of virtual networks sharing the same physical infrastructure even if the infrastructure is not fully trusted. The invention is not restricted to virtual networks, but could also be used e.g. in point-to-point (P2P), ad-hoc networks, and in any network where firewalls are not suitable or sufficient.

There is no specific requirement on how the trust relationship should be established. The way the intra-cluster trust mechanism and trustworthiness judging operation can be done is very flexible, and can be decided independently for each cluster. The way it is done inside a given cluster does not affect clusters outside. The choice of deputies is optional as well, and there is no requirement for their location. These aspects give a high flexibility to each cluster, even e.g. allowing it subdivide itself into sub-clusters in case the cluster is e.g. getting too big, without affecting the rest of the network.

The proposed concept could also be adapted to enhance privacy, e.g. by removing the source address of the originating node when a packet is certified, and replacing it by the certifier's address. In other words, the certification operation performed by nodes in a network could additionally comprise replacing a source indicator (e.g. the source address) in a data element (e.g. a packet) being forwarded by a source indicator of the communication node performing the certification operation. If every certifier removes the source address after certification, privacy will be ensured outside the cluster. A potential sniffer outside the cluster can then not tell where exactly a data element originates. However, for traceability, tagging or a record of modifications at the certifier may be employed.

As a further advantage, if misbehaviour (e.g. attacks or illegitimate data elements originating from a node) is detected, the cluster of the misbehaving node can be isolated by revoking the credentials of multi-cluster-member nodes of that cluster, thereby limiting the misbehaviour to that cluster, while the other clusters of the network remain unaffected.

The present invention has been described with reference to specific examples. This description is not intended to be limiting to the invention, which is defined by the appended claims. Reference numerals and reference indications in the claims serve to make the claims easier to read, but also are not intended to have any limiting effect.

The invention claimed is:

1. A method of providing trustworthiness of communication among a plurality of communication nodes configured for transmitting, receiving, and processing data packets that conform to a given protocol, wherein said communication nodes are grouped into a plurality of distinguishable clusters, each cluster comprising at least two of said communication nodes, and at least one cluster comprising at least three of said communication nodes, said method comprising:

at each of said communication nodes, performing a trustworthiness judging operation on received data packets for judging a received data packet to be trustworthy or not, implementing in each respective cluster an intra-cluster trust mechanism such that trustworthiness of data packets that are sent by any member node of said respective cluster and that are sent in conformance with the intra-cluster trust mechanism implemented in said respective cluster is judgable within said respective cluster, wherein each member node of said respective cluster is configured to send data packets in conformance with the intra-cluster trust mechanism implemented in said respective cluster, wherein the intra-cluster trust mechanism implemented in any given cluster comprises a key or key pair that is used to encrypt and decrypt a data packet sent within the given cluster, wherein the data packet is judged as trustworthy or not based on whether a result of decrypting the data packet is verified or not, and wherein a source indicator of the data packet is replaced with a source indicator of a communication node that encrypts the data packet;

routing inter-cluster traffic through at least one of a plurality of multi-cluster-member nodes, wherein each of said clusters comprises one or more multi-cluster-member nodes that belong to at least two different of said clusters, and at each of said multi-cluster-member nodes, selecting to act in the capacity of different clusters when sending different data packets to those different clusters, by sending the different data packets in conformance with the different intra-cluster trust mechanisms respectively implemented by the different clusters, wherein each of said multi-cluster member nodes is configured to receive a data packet from a source cluster and to send the data packet to a destination cluster by decrypting the data packet with the key or key pair implemented in the source cluster and encrypting the data packet with the key or key pair implemented in the destination cluster;

wherein one or more said communication nodes belong to a virtual network and are hosted by an untrusted physical network node that also hosts a communication node belonging to a different virtual network such that the untrusted physical network node is shared by multiple different virtual network operators.

2. The method of claim 1, wherein at least one of said clusters is divided into a plurality of sub-clusters, and wherein the method further comprises, at each sub-cluster, implementing an associated intra-sub-cluster trust mechanism, and wherein at least one multi-sub-cluster-member node belongs to at least two different of said sub-clusters for routing inter-sub-cluster traffic.

3. The method of claim 1, wherein said trustworthiness judging operation comprises one or both of examining trustworthiness of said received data packet and requesting examining trustworthiness of said received data packet by a designated node of the same cluster.

4. The method of claim 1, wherein said trustworthiness judging operation comprises dropping data packets that are judged to lack trustworthiness.

5. The method of claim 1, wherein at least a first one of said clusters is associated with a corresponding first key set used for both the trustworthiness judging operations and said intra-cluster trust mechanism of said first cluster.

6. The method of claim 5, wherein said communication nodes are grouped into n clusters, n being an integer larger than one, and each i-th cluster is associated with a corresponding i-th key set used for both the trustworthiness judging operations and said intra-cluster trust mechanism of said i-th cluster, where i=2, . . . , n.

7. The method of claim 1, further comprising, at each of said multi-cluster-member nodes:
   determining that a particular data packet is to be sent to a particular communication node;
   selecting, from among the intra-cluster trust mechanisms respectively implemented in the multiple clusters to which the node belongs, an intra-cluster trust mechanism to which the particular data packet is to conform as being an intra-cluster trust mechanism implemented by a cluster to which the particular communication node belongs; and
   sending to the particular communication node the particular data packet in conformance with the selected intra-cluster trust mechanism.

8. The method of claim 1, wherein, for at least one pair of clusters, only one multi-cluster member node belongs to both of the clusters in that pair.

9. The method of claim 1, wherein said routing comprises routing at least some data packets from a first cluster to a second cluster through only one multi-cluster member node that belongs to both the first and second clusters.

10. The method of claim 1, wherein the intra-cluster trust mechanism implemented in each respective cluster is chosen and managed independent of the intra-cluster trust mechanism implemented in each other of the clusters.

11. The method of claim 1, wherein said routing comprises unicast routing a data packet that has a single communication node as the data packet's destination.

12. A system comprising a plurality of communication nodes configured for transmitting, receiving, and processing data packets that conform to a given protocol, wherein said communication nodes belong to a virtual network, wherein at least one of said communication nodes is hosted by an untrusted physical network node that also hosts a communication node belonging to a different virtual network such that the untrusted physical network node is shared by multiple different virtual network operators, wherein each communication node is configured to perform a trustworthiness judging operation on received data packets for judging a received data packet to be trustworthy or not, said plurality of communication nodes being grouped into a plurality of distinguishable clusters, each cluster comprising at least two of said communication nodes, wherein each respective cluster implements an intra-cluster trust mechanism such that trustworthiness of data packets that are sent by any member node of said respective cluster and that are sent in conformance with the intra-cluster trust mechanism implemented in said respective cluster is judgable within said respective cluster, wherein each member node of said respective cluster is configured to send data packets in conformance with the intra-cluster trust mechanism implemented in said respective cluster, wherein the intra-cluster trust mechanism implemented in any given cluster comprises a key or key pair that is used to encrypt and decrypt a data packet sent within the given cluster, wherein the data packet is judged as trustworthy or not based on whether a result of decrypting the data packet is verified or not, and wherein a source indicator of the data packet is replaced with a source indicator of a communication node that encrypts the data packet, said clusters being arranged such that each of said clusters comprises one or more multi-cluster-member nodes that belong to at least two different of said clusters, and said plurality of communication nodes being arranged to perform routing of inter-cluster traffic through said multi-cluster-member nodes, wherein each of said multi-cluster-member nodes is configured to select to act in the capacity of different clusters when sending different data packets to those different clusters, by sending the different data packets in conformance with the different intra-cluster trust mechanisms respectively implemented by the different clusters, wherein each of said multi-cluster member nodes is configured to receive a data packet from a source cluster and to send the data packet to a destination cluster by decrypting the data packet with the key or key pair implemented in the source cluster and encrypting the data packet with the key or key pair implemented in the destination cluster.

13. The system of claim 12, wherein each of said multi-cluster-member nodes is configured to:
   determine that a particular data packet is to be sent to a particular communication node;
   select, from among the intra-cluster trust mechanisms respectively implemented in the multiple clusters to which the node belongs, an intra-cluster trust mechanism to which the particular data packet is to conform as being an intra-cluster trust mechanism implemented by a cluster to which the particular communication node belongs; and
   send to the particular communication node the particular data packet in conformance with the selected intra-cluster trust mechanism.

14. The system of claim 12, wherein the intra-cluster trust mechanism implemented in each respective cluster is chosen and managed independent of the intra-cluster trust mechanism implemented in each other of the clusters.

15. The system of claim 12, wherein said communication nodes belong to an ad-hoc network.

16. The system of claim 12, wherein said plurality of communication nodes are configured to perform unicast routing of a data packet that has a single communication node as the data packet's destination.

* * * * *